Dec. 8, 1959   J. J. DIGBY   2,915,904
ENGINE STARTER GEARING
Filed Sept. 27, 1956

WITNESS:
Esther M. Stockton

INVENTOR.
James J. Digby
BY
Clinton S. James
ATTORNEY

United States Patent Office 2,915,904
Patented Dec. 8, 1959

2,915,904

ENGINE STARTER GEARING

James J. Digby, Elmira, N.Y., assignor to Bendix Aviation Corporation, Elmira Heights, N.Y., a corporation of Delaware Application September 27, 1956, Serial No. 612,516

5 Claims. (Cl. 74—7)

The present invention relates to engine starter gearing and more particularly to a form of drive employing a solid pinion member of small diameter securing a high reduction ratio to the engine gear, with adequate strength and service life.

It is an object of the present invention to provide a novel starter drive of this character which is simple and economical in construction and convenient to assemble.

It is another object to provide such a device in which the operative position and alignment of the pinion are accurately maintained under cranking load.

Figure 1:
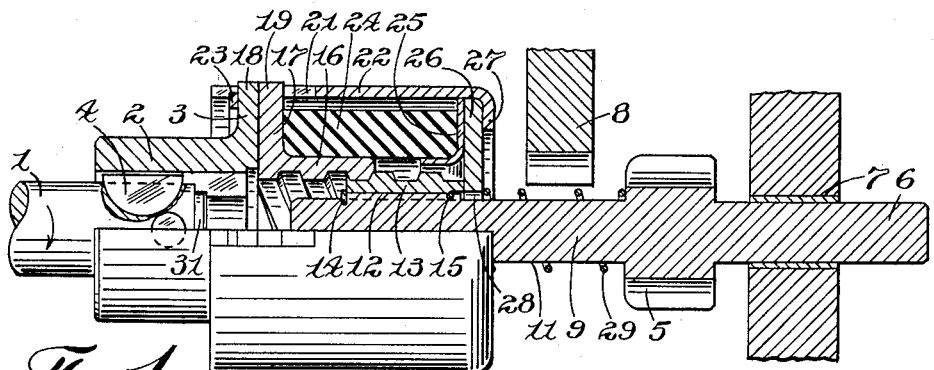
Figure 2:
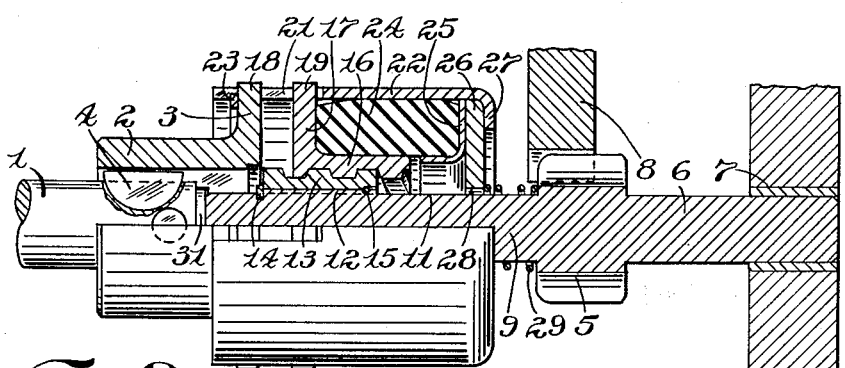

Further objects and advantages will be apparent from the following description taken in connection with the accompanying drawing in which:

Fig. 1 is a side elevation, partly broken away and in section, of a preferred embodiment of the invention showing the parts in normal or idle position; and Fig. 2 is a similar view showing the parts in cranking position.

In Fig. 1 of the drawing there is illustrated a power shaft 1 on the end of which a driving head 2 having a radial flange 3 is fixedly mounted in any suitable manner as indicated at 4. A solid pinion and shaft member 5 located in alignment with the power shaft 1 is provided with a smooth cylindrical extension 6 slidably journalled in a fixed outboard bearing 7 whereby the pinion is movable into and out of mesh with an engine gear 8.

The pinion member 5 is also formed with a shaft 9 extending toward the power shaft 1, said shaft being smooth for a portion of its length as indicated at 11, and having splines 12 formed thereon beyond said smooth portion. A hollow screw shaft 13 is keyed on said splined portion of the shaft 9, being located thereon by means of lock rings 14, 15 adjacent the ends thereof. A control nut 16 is threaded on the screw shaft and formed with a flange 17 normally in abutting relation with the flange 3 of the driving head 2.

The flanges 3 and 17 of the driving head and control nut are formed with radial lugs 18 and 19 respectively which are slidably received in slots 21 in the open end of a barrel member 22, being retained therein by a lock ring 23. A cylindrical block 24 of elastically deformable material such as rubber is seated on the control nut 16 on one end, and at its other end on a thimble 25 which rests against a thrust plate 26 which is retained in the barrel 22 by an inwardly directed flange 27 thereon. The thrust plate 26 bears on the smooth portion 11 of the pinion member 5, being formed with splined grooves 28 to permit assembly over the splines 12 of the pinion member. An anti-drift spring 29 located between the toothed portion of the pinion member 5 and the thrust plate 26 normally maintains the pinion member in extended relation with the screw shaft 13 abutting the thrust plate 26 as shown in Fig. 1.

The cranking position of the pinion member is defined by engagement with the end of the power shaft 1, a thrust washer 31 being preferably interposed between the ends of the shafts.

The inner end of the extension 9 of the pinion member is smooth and has a bearing fit within a reduced portion of the driving head 2 to assist in maintaining alignment of the pinion member during cranking.

In operation, starting with the parts in the positions illustrated in Fig. 1, rotation of the power shaft in the direction of the arrow is transmitted through the driving head 2 to the control nut 16 by reason of their common splined relation to the barrel member 22. The screw shaft 13 is consequently moved to the left, drawing the pinion member 5 with it by virtue of the lock ring 14 until the end of the pinion member engages the thrust washer 31, at which time the pinion is meshed with the engine gear 8. The cranking load then causes the control nut 16 to be moved to the right by screw-jack action, such motion being resisted and cushioned by compression of the elastic member 24 against the thrust plate 26. When the engine starts, the over-running of the pinion member causes the parts to be returned to idle position where they are yieldingly maintained by the anti-drift spring 29.

Although but one embodiment of the invention has been shown and described in detail it will be understood that changes may be made in the design and arrangement of the parts without departing from the spirit of the invention.

I claim:

1. In an engine starter drive, a power shaft, a driving head fixed thereon and extending beyond the end of said shaft, a solid pinion and shaft element mounted in alignment with the power shaft for axial movement toward and from the power shaft to bring the pinion into and out of mesh respectively with a gear of the engine to be started, the end of the shaft forming an abutment for the pinion and shaft element defining the meshed position of the pinion, a hollow screw shaft non-rotatably mounted on the pinion member, means for positioning the screw shaft axially on the pinion member, a control nut threaded on the screw shaft normally engaging the driving head, means for positively coupling the drive head and control nut for alignment and rotation in unison, and yielding means resisting axial separation thereof.

2. An engine starter drive as set forth in claim 1 in which said coupling means comprises a barrel member in which the driving head and control nut are slidably but non-rotatably mounted, and yielding means including a yielding buffer in the barrel for pressing the drive head and control nut together.

3. An engine starter drive as set forth in claim 2 including further a stop member fixed in the barrel providing an abutment for the screw shaft defining its idle position, and means including a spring on the pinion member for yieldingly holding the screw shaft against said stop member.

4. An engine starter drive as set forth in claim 1 in which the pinion member is formed with cylindrical extensions on both sides of the pinion, an outboard bearing slidably receiving and rotatably supporting one of said extensions, the driving head being arranged to extend beyond the end of the motor shaft and having a cylindrical bore adapted to receive and support the adjacent extension of the pinion member when in meshed position.

5. An engine starter drive as set forth in claim 2 in which one end of the barrel member is open and is slotted axially, and the driving head and control nut are provided with radially extending lugs slidably received in said slots; a lock ring retaining the driving head and control nut in the barrel, an annular thrust plate seated in the opposite end of the barrel, said yielding buffer being located between the control nut and thrust plate.

References Cited in the file of this patent

UNITED STATES PATENTS

| | | |
|---|---|---|
| 2,199,349 | Sekella | Apr. 30, 1940 |
| 2,281,365 | Martin | Apr. 28, 1942 |
| 2,407,158 | Jones | Sept. 3, 1946 |
| 2,420,283 | Buxton et al. | May 6, 1947 |
| 2,569,267 | Tobias | Sept. 25, 1951 |
| 2,602,335 | Miller | July 8, 1952 |
| 2,635,471 | Lewis | Apr. 21, 1953 |
| 2,771,780 | Lafitte | Nov. 27, 1956 |